J. W. SIMMONS.
ANTIFRICTION BEARING.
APPLICATION FILED FEB. 16, 1918.

1,294,183.

Patented Feb. 11, 1919.

John W. Simmons, INVENTOR,

WITNESSES
Howard L. Orr.
F. T. Chapman.

BY
ATTORNEY

UNITED STATES PATENT OFFICE.

JOHN W. SIMMONS, OF CLEVELAND, OHIO.

ANTIFRICTION-BEARING.

1,294,183.     Specification of Letters Patent.     Patented Feb. 11, 1919.

Application filed February 16, 1918. Serial No. 217,574.

*To all whom it may concern:*

Be it known that I, JOHN W. SIMMONS, a citizen of the United States, residing at Cleveland, in the county of Cuyahoga and State of Ohio, have invented new and useful Antifriction-Bearings, of which the following is a specification.

This invention has reference to anti-friction bearings and is designed particularly for use on automobiles although not confined to such use since the bearing may be employed in other structures than automobile wheels.

The object of the invention is to provide an anti-friction roller bearing of especially sturdy construction and one which may be repaired at small expense and by persons who are not particularly skilled in such work, since there is no need of the employment of special machinery or mechanism either in removing or replacing the bearing in whole or in part.

In accordance with the invention, the bearing comprises an inner conical member or cone and an outer race, which latter constitutes the only carrying member for the rollers. Split rings of peculiar form are associated with the roller race to hold the latter thereto in such manner that while the rollers in the assembled anti-friction bearing are positively held against possible escape, the rings, or one of them, may be readily removed, thus permitting the dismantling of the structure or replacing a damaged roller with a perfect one, the bearing being restored to its first condition by springing the ring into place.

The structure has the advantages over other roller bearings in that it is possible to form the inner cone and the outer roller race heavier than heretofore without correspondingly increasing the size of the structure, whereby the anti-friction bearing has increased strength and life.

The invention will be best understood from the consideration of the following detailed description taken in connection with the accompanying drawings which form a part of this specification, with the further understanding that while the drawings show a particular embodiment of the invention, the latter is not confined to any strict conformity with the showing of the drawings but may be changed and modified so long as such changes and modifications mark no material departure from the salient features of the invention as set forth in the appended claims.

Figure 1:
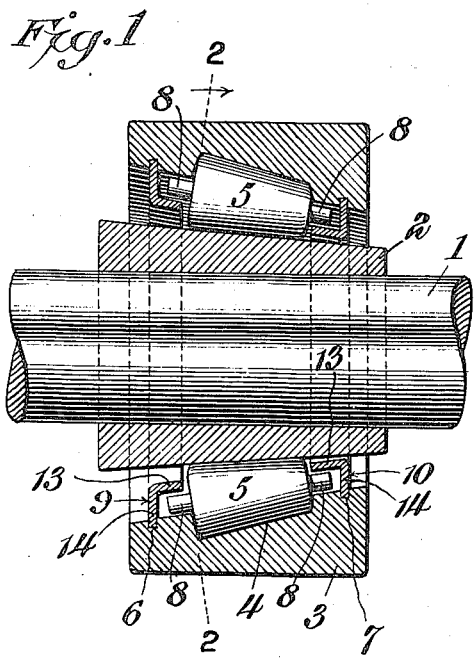
Figure 1 is a diametric section through anti-friction bearings constructed in accordance with the invention, with the bearings applied to a shaft or spindle and certain parts shown in elevation.
Figure 2:
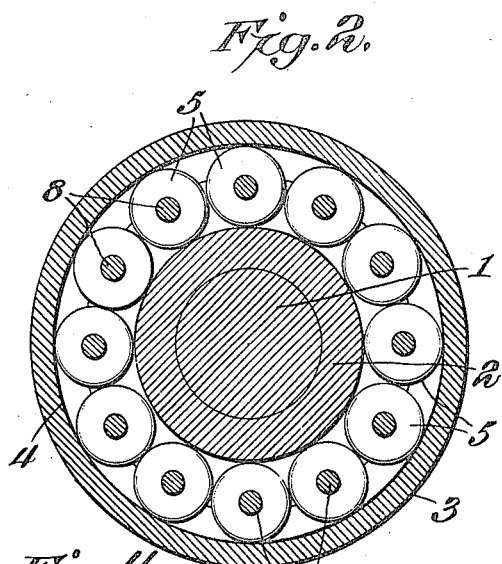
Fig. 2 is a section on the line 2—2 of Fig. 1.
Figure 3:
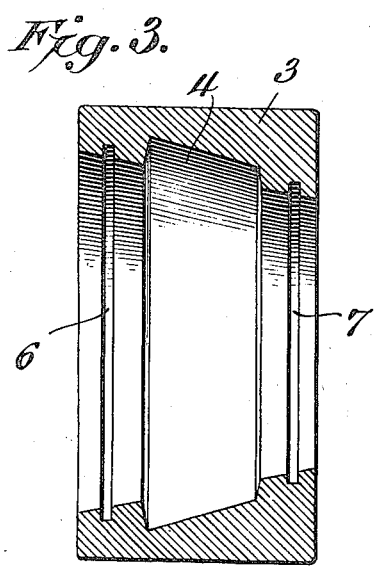
Fig. 3 is a longitudinal diametric section through the outer member or roller race.

Referring to the drawings there is shown a shaft or spindle 1 which may be taken as indicative of an axle spindle or any other member to which the anti-friction bearing of the invention is to be applied.

Mounted on the spindle 1 is a plain cone 2 in the form of a sleeve having its inner face fitting the spindle 1 and the outer face tapering from one end to the other. Surrounding and spaced from the conical sleeve 2 is another sleeve 3 internally tapering in correspondence with the taper of the outer surface of the cone 2. The inner wall of the sleeve 3 is formed with a circumferential groove 4 arranged to receive a series of rollers 5, the latter tapering to allow for the difference in diameter between the two ends of the groove since said groove also tapers with respect to the longitudinal axis of the sleeve 3. In the internally tapering wall of the sleeve 3 on opposite sides of the groove 4 and between the latter and the respective ends of the sleeve, are circumferential grooves 6 and 7 respectively for a purpose which will hereinafter appear.

Figure 4:
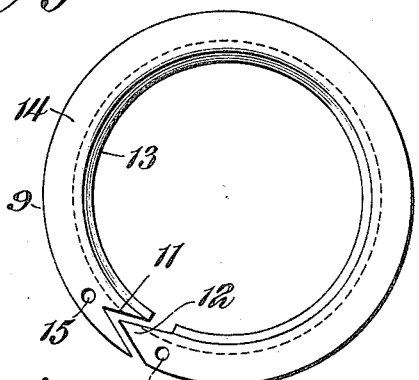
Fig. 4 is an outer face view of the larger retaining ring.
Figure 5:
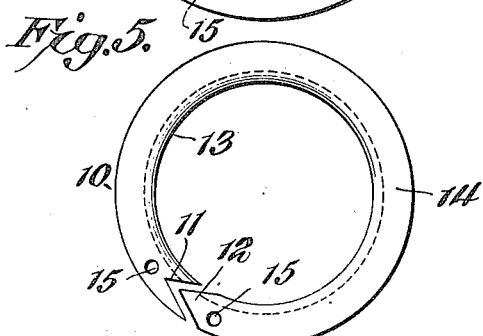
Fig. 5 is an outer face view of the smaller retaining ring.

The taper rollers 5 are provided with journals 8 at the ends and these journals travel in respective rings 9 and 10 shown separately in Figs. 4 and 5 and also appearing in Fig. 1. Each ring is a split ring having the adjacent ends formed one with a notch or recess 11 and the other with a corresponding projection or tongue 12. The tongue 12 is arranged to enter the notch 11 but normally the adjacent ends of the split ring are somewhat separated so that the ring may be contracted sufficiently to enter the corresponding end of the sleeve 3 up to the groove 6 or 7 as the case may be. Each ring 9 or 10 is of angular cross section providing two webs 13 and 14. The web 13 of the respective rings is arranged to override the journals 8 of the rollers 5 while the web 14 of each ring seats in the groove 6 or 7, as the case may be, of the sleeve 3; the expansive tendencies of the ring causes this seating when the ring is contracted and inserted into the sleeve 3 into coincidence with the respective grooves 6 or 7. To facilitate the contracting of the ring 9 or 10, each ring at its adjacent ends on opposite sides of the split, is provided with perforations 15 for the application of a suitable tool, such for instance as round nose pliers or for the application of a special tool, whereby the ring may be contracted in order to insert it into the sleeve 3 or may be contracted to permit its removal from the sleeve 3 by contracting the ring sufficiently to carry the web 14 out of the corresponding groove 6 or 7.

The sleeve 3 may be made relatively thick and the walls of the sleeve where entered by the groove 4 may be also quite thick, whereby the sleeve 3 is of sturdy construction and will withstand wear and hard usage. Moreover, the rings are carried solely by the sleeve 3 and the latter is arranged to be carried by the wheel hub when the anti-friction bearings are installed on the wheel, so that no part of the anti-friction bearings except the plain conical sleeve or cone 2 remains upon the wheel spindle when the wheel is removed.

When it is desired to replace or repair the bearings the wheel is removed from the spindle and with it all of the bearings except the plain sleeve 2 of each bearing. This leaves the retaining rings 9 and 10 readily accessible, and on taking out these retaining rings, or either of them, a damaged roller may be replaced by a new one, or if need be, either or both of the sleeves 2 and 3 may be readily replaced even by a person not particularly skilled in such work.

The bearing structure is a portion of an automobile especially liable to damage from wear or other cause and in the case of ordinary roller bearings the expenses of repairs are frequently high. With the roller bearings of this invention, the various parts are so readily removable that it is only necessary to repair damaged or worn parts without the necessity of discarding the whole bearing structure or returning the bearing structure to the factory or even employing skilled labor to make the repairs.

By making the adjustable ends of the split rings respectively of taper notch and taper tongue formation, the liability of catching the journals of the rollers is avoided.

In the drawings the roller bearing shown in Fig. 1 is of a character adapted for the inner end of a wheel hub but when the bearing is applied to the outer end of the wheel hub the sleeve 2 is internally threaded to fit a correspondingly threaded portion of the axle spindle. This last arrangement, however, is not shown since it is commonly employed in roller bearings for wheels.

What is claimed is:

1. An anti-friction bearing, comprising inner and outer bearing sleeves having their adjacent faces tapering, taper rollers with end journals and interposed between the bearing sleeves, the outer sleeve having an internal circumferential groove forming a roller race and with other inner circumferential grooves flanking the roller race, and split retaining rings of angular cross section sprung into the flanking grooves and holding the rollers from escaping from the outer bearing sleeve, whereby the outer sleeve with the rollers held thereonto may be removed as a whole from or placed about the inner bearing sleeve.

2. An anti-friction bearing, comprising an inner sleeve with its outer face plain and tapering from one end toward the other of the sleeve, an outer sleeve with an inner face tapering from one end toward the other of the sleeve and having a circumferential groove located between the ends of the sleeve and other grooves flanking the first named groove, taper rollers with end journals and lodged in the first named groove, and split retaining rings of angular cross section and each having a web seated in the respective one of the second named grooves with the other web overlying a respective journal of each roller, whereby the rollers are retained on and carried solely by the outer sleeve.

3. An anti-friction bearing, comprising inner and outer sleeves, a circumferential series of rollers with end journals seated on the inner face of the outer sleeve and bearing against the outer face of the inner sleeve, and split retaining rings carried by the outer sleeve on its inner face for holding the rollers in position on the inner sleeve, each retaining ring having the adjacent ends, where split, of respective taper-notch and taper-tongue conformation to prevent catching the journals of the rollers.

4. An anti-friction bearing comprising an inner sleeve with a plain conical or taper outer face, an outer sleeve with an inner conical or taper face corresponding to the taper of the outer face of the inner sleeve, the taper face of the outer sleeve having therein a circumferential groove intermediate of its ends, taper rollers seated in the groove, and retaining means for the rollers carried by the outer sleeve, whereby the outer sleeve with the rollers and retaining means may be applied to and removed from the inner sleeve intact.

In testimony, that I claim the foregoing as my own, I have hereunto affixed my signature in the presence of two witnesses.

JOHN W. SIMMONS.

Witnesses:
   JOHN H. SIGGERS,
   DAVID R. WAGNER.